(No Model.) 2 Sheets—Sheet 1.

C. H. METZ.
BICYCLE WHEEL.

No. 478,064. Patented June 28, 1892.

Witnesses
Irving H. Fay,
H. Durfee

Inventor
Charles H. Metz,
By C. A. Shaw & Co.,
Attys (No Model.) 2 Sheets—Sheet 2.
C. H. METZ.
BICYCLE WHEEL.
No. 478,064. Patented June 28, 1892.
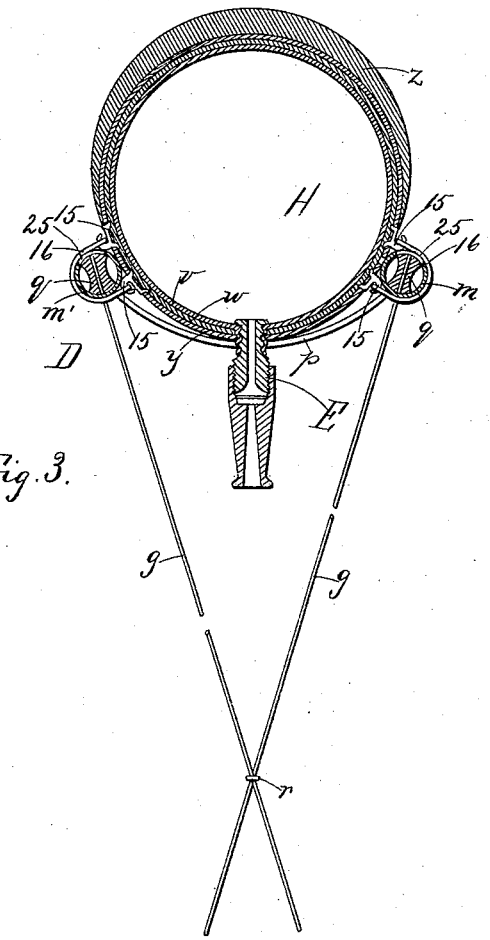
Fig. 3.
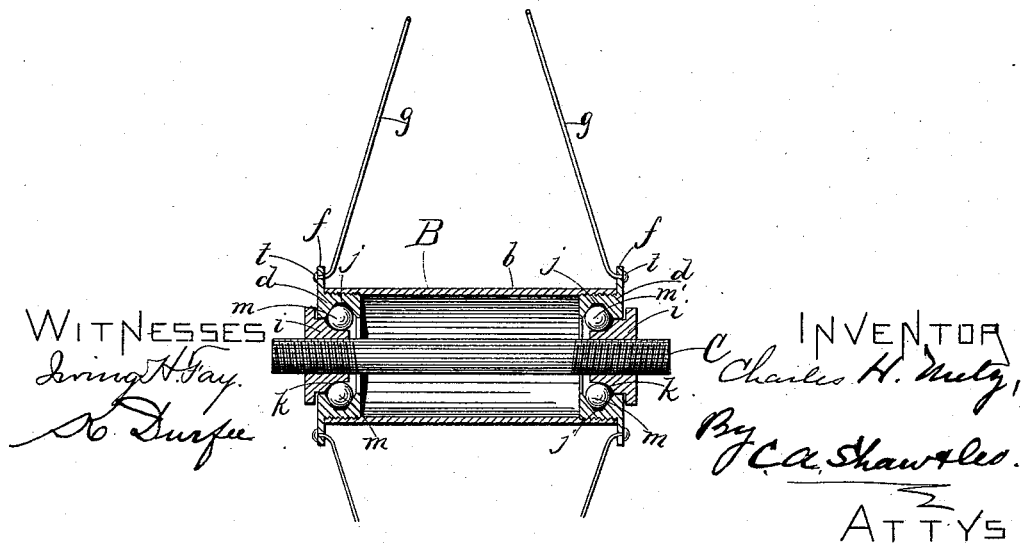
Witnesses:
Irving H. Fay.
L. Durfee.
Inventor
Charles H. Metz,
By C. A. Shawtleo.
Attys

UNITED STATES PATENT OFFICE.

CHARLES H. METZ, OF HIGHLANDVILLE, MASSACHUSETTS.

BICYCLE-WHEEL.

SPECIFICATION forming part of Letters Patent No. 478,064, dated June 28, 1892.

Application filed September 18, 1891. Serial No. 406,091. (No model.)

*To all whom it may concern:*

Be it known that I, CHARLES H. METZ, of Highlandville, in the county of Norfolk, State of Massachusetts, have invented certain new and useful Improvements in Bicycle-Wheels, of which the following is a description sufficiently full, clear, and exact to enable any person skilled in the art or science to which said invention appertains to make and use the same, reference being had to the accompanying drawings, forming part of this specification, in which—

Figure 1:
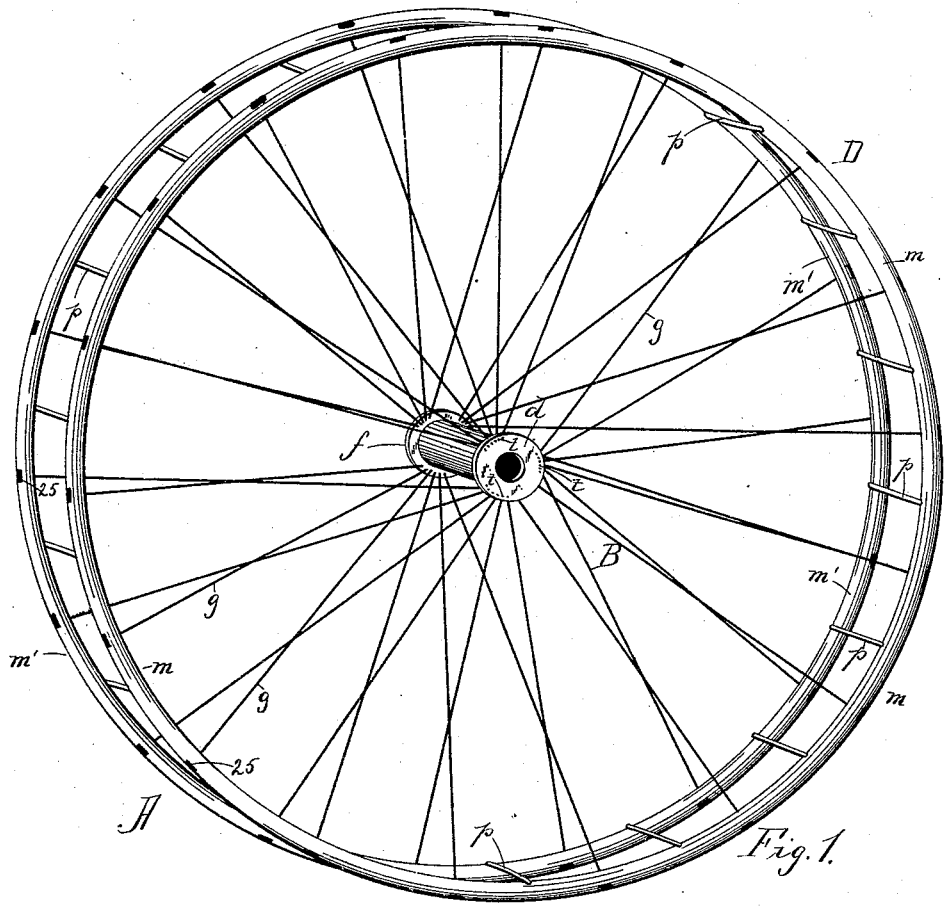
Figure 2:
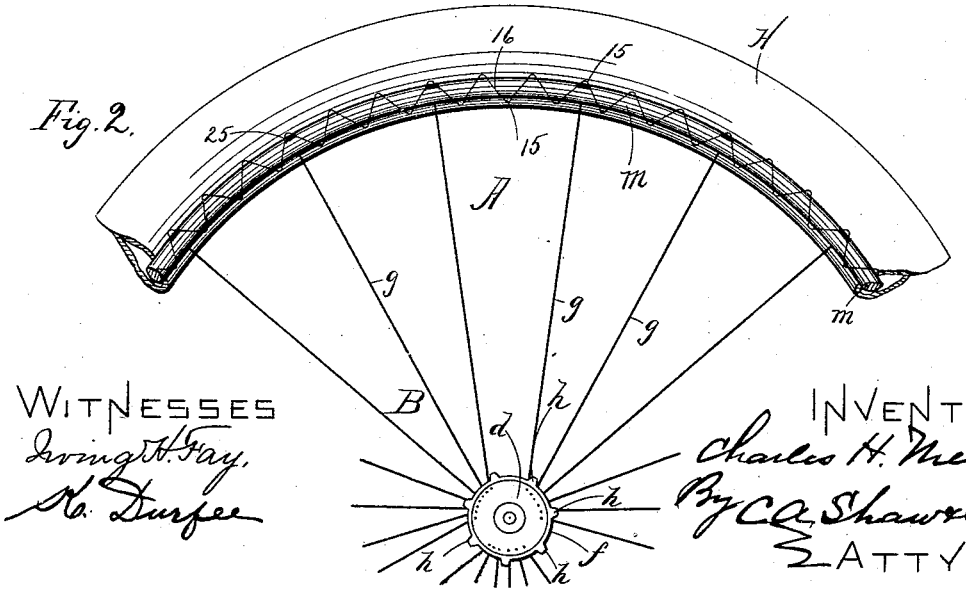

Figure 1 is a perspective view of my improved bicycle-wheel; Fig. 2, a sectional elevation of the rear wheel, showing the pneumatic tire in position; Fig. 3, a vertical transverse section, enlarged, showing the hub, method of constructing the tire, and means for attaching the same to the felly.

Like letters and figures of reference indicate corresponding parts in the different figures of the drawings.

My invention relates especially to the manner of constructing bicycle-wheels and means for attaching the tire thereto, whereby greatly-increased rigidity is imparted to the wheel at slight increase of cost; and it consists in certain novel features hereinafter fully set forth and claimed, the object being to produce a simpler, cheaper, and more effective device of this character than is now in ordinary use.

The nature and operation of the improvement will be readily understood by all conversant with such matters from the following explanation.

In the drawings, A represents the wheel, considered as a whole. The hub B (see Fig. 3) of the wheel consists of a metallic tube $b$, interiorly screw-threaded to receive correspondingly-threaded bush-nuts $d$, said nuts being provided, respectively, with annular flanges $f$, in which the spokes $g$ are secured. These flanges on the forward wheel are plain; but on the rear wheel, in the form of bicycle known as "Safety," are provided with spurs $h$, forming a sprocket-wheel for the ordinary jack-chain, by which the machine is driven in the usual manner. The axle C has its ends screw-threaded, and a flanged nut $i$ is turned onto each of the said ends. The bush-nuts $d$ are provided interiorly with an annular groove $j$, (shown in Fig. 3,) and the nuts $i$ are provided with an annular curved rabbet $k$, which registers with said groove $j$ when the nuts are in position in the hub. Said grooves and rabbets $j$ $k$ form races in which balls $m$ travel. A simple and cheap ball-bearing is thus afforded, in which the wear can be readily taken up by turning in the nuts $i$.

The felly of the wheel is double or constructed of two hoop-shaped tubes $m'$ $m''$, connected by inwardly-curved brace-rods $p$ at suitable intervals. The spokes $g$ are secured in the tubes $m'$ $m''$ by interiorly-disposed nuts $q$, (shown in Fig. 3,) which are fitted to slide within the tube and into which the ends of the spokes $g$ are turned. Each of said spokes are crossed and secured together at their intersection by a metallic strap $r$. The spokes from the tube $m'$ extend to the opposite bush-nut $d$ and are riveted at $t$ in the flange $f$ thereof, and the spokes from the opposite tube $m''$ are riveted in like manner in the flange $f$ of the opposite bush-nut $d$. By this arrangement, and as best shown in Fig. 2, the spokes are disposed in lines approximately tangent to the axle.

The pneumatic tire H is practically of the ordinary form and construction and comprises an inner expansible tube $v$ (see Fig. 3) of rubber and two casing-tubes of canvas, the tread of the wheel being projected in the ordinary manner by a rubber facing $z$, crescent-shaped in cross-section and vulcanized onto the outer canvas $y$. The tire is inflated by means of a screw-valve E of the ordinary form. Riveted in the outer canvas covering $y$ there are two series of lacing-hooks 15, similar in construction to the hooks ordinarily employed in lacing-shoes. The hooks of each series alternate with those of the companion series, as shown in Fig. 2. The tire H is secured in the felly D by means of a lacing-cord 16, which passes around the respective felly-tubes $m'$ $m''$ and the adjacent hooks. Said hooks are arranged, as shown in Fig. 3, preferably at the termination of the crescent-shaped tire-facing $z$. By this construction the tire may be quickly and easily removed from the felly for repairs, and the necessity of employing cement or similar means for securing the same thereon is avoided.

By constructing the wheel with its felly formed from twin hollow hoops $m'$ $m''$, connected by braces, extreme lightness is attained and the hoops may be disposed sufficiently far apart to receive a tire of much greater diameter than wheels of ordinary construction. The rigidity of the wheel is increased over the ordinary form by disposing the spokes in approximately tangent lines, while no more spokes are employed than in the usual construction. Moreover, this structure permits a spoke to be removed from one of the felly-rims without dismounting the tire, which is necessary when tires are cemented to the felly and the spokes rigidly secured thereto. The nuts or nipples $q$ are readily inserted in the openings 25 in the outer face of the felly, hoops $m'$ $m''$ permitting the tension of the spokes to be regulated or said spokes to be removed at will. It will be noted that the hub ends of the spokes, headed at $t$, are passed through the hub-flanges $f$ in sets, while their outer ends are secured in the felly-rims equidistant or at regular intervals, disposing them in approximate tangent lines, as specified. The spokes in the driving-wheel are thus prevented from springing when power is applied, while the wheel at the hub may be very narrow, allowing at the same time of a great angle to the spokes, as best shown in Fig. 2.

I do not confine myself to constructing the felly-rims $m'$ $m''$ of tubular hoops, as they may be solid or crescent-shaped in cross-section; but I prefer the tubular form, as it affords greater strength.

Having thus explained my invention, what I claim is—

1. A bicycle-wheel provided with two fellies disposed apart from each other and a tire disposed on said fellies and spanning the space between them, the periphery of said tire being beyond the peripheries of the fellies.

2. In a bicycle-wheel, the combination of a felly formed of two hoop-shaped tubes connected by braces and provided on their interior with slide-nuts and spokes fitting into said slide-nuts.

3. In a bicycle-wheel, the combination of a felly formed of two hoop-shaped tubes connected by braces, a bicycle-tire provided with two sets of hooks on each side, and a lacing-cord passing around the hoop-shaped tubes and connecting the upper and lower hooks of each side.

4. In a bicycle-wheel, the combination of a felly formed of two hoop-shaped tubes, braces connecting said tubes, a tire resting on said braces between said tubes, and lacing-cords for attaching said tire to the tubes.

5. In a bicycle-wheel, a felly formed of two parallel rims connected by brace-rods, in combination with a hub, spokes connecting the hub ends with opposite felly-rims, said spokes being arranged in lines approximately tangent to said hub, substantially as set forth.

6. The wheel A, provided with felly D, having rims $m'$ $m''$, in combination with the hub, and the crossed spokes $g$, connecting said hub and rims, each pair of spokes being strapped or secured together at or near their center portion by a band, substantially as described.

7. A bicycle-wheel the spokes of which are arranged in sets or groups at the hub, the spokes of each set being disposed at different angles to the radii of the wheel.

8. A bicycle-wheel the spokes of which are arranged in sets or groups at the hub and at the same distances apart at the felly, spokes of each set being disposed at different angles to the radii of the wheel.

9. A bicycle-wheel having a felly formed of two parallel rims connected by brace-rods, a hub, and spokes connecting the hub ends with opposite felly-rims, said spokes being arranged in sets or groups at the hub, spokes of each set being disposed at different angles to the radii of the wheel.

10. A bicycle-wheel having a felly formed of two hoop-shaped tubes connected by braces, a tire resting on said braces between said tubes, lacing-cords for attaching said tire to the tubes, a hub, and spokes connecting the hub ends with opposite felly-rims, said spokes being arranged in sets or groups at the hub and at regular or nearly regular intervals at the fellies, so that said spokes are approximately tangent to the hub.

CHARLES H. METZ.

Witnesses:
O. M. SHAW,
K. DURFEE.